No. 812,464. PATENTED FEB. 13, 1906.
A. SWASEY & G. L. FECKER.
OPTICAL INSTRUMENT.
APPLICATION FILED NOV. 3 1905.
2 SHEETS—SHEET 2.
Fig. 4.
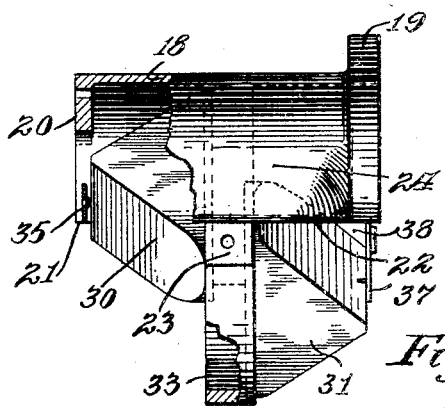
Fig. 5.
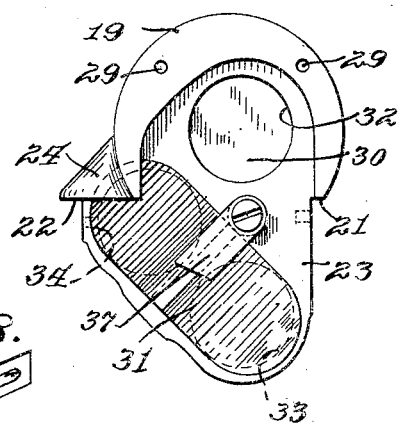
Fig. 8.
Fig. 6.
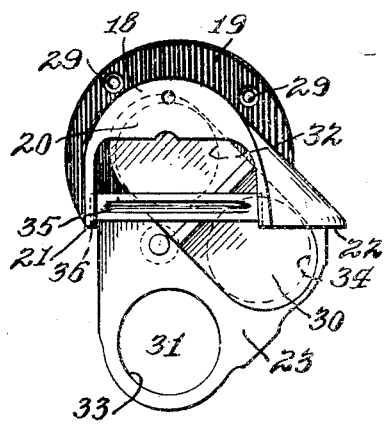
Fig. 7.
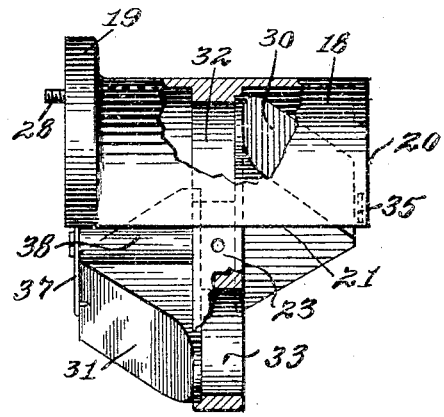
WITNESSES.
R. W. Pittman
G. G. Fuss
INVENTORS:
Ambrose Swasey,
Gottlieb L. Fecker,
By their Attorney
F. H. Richards

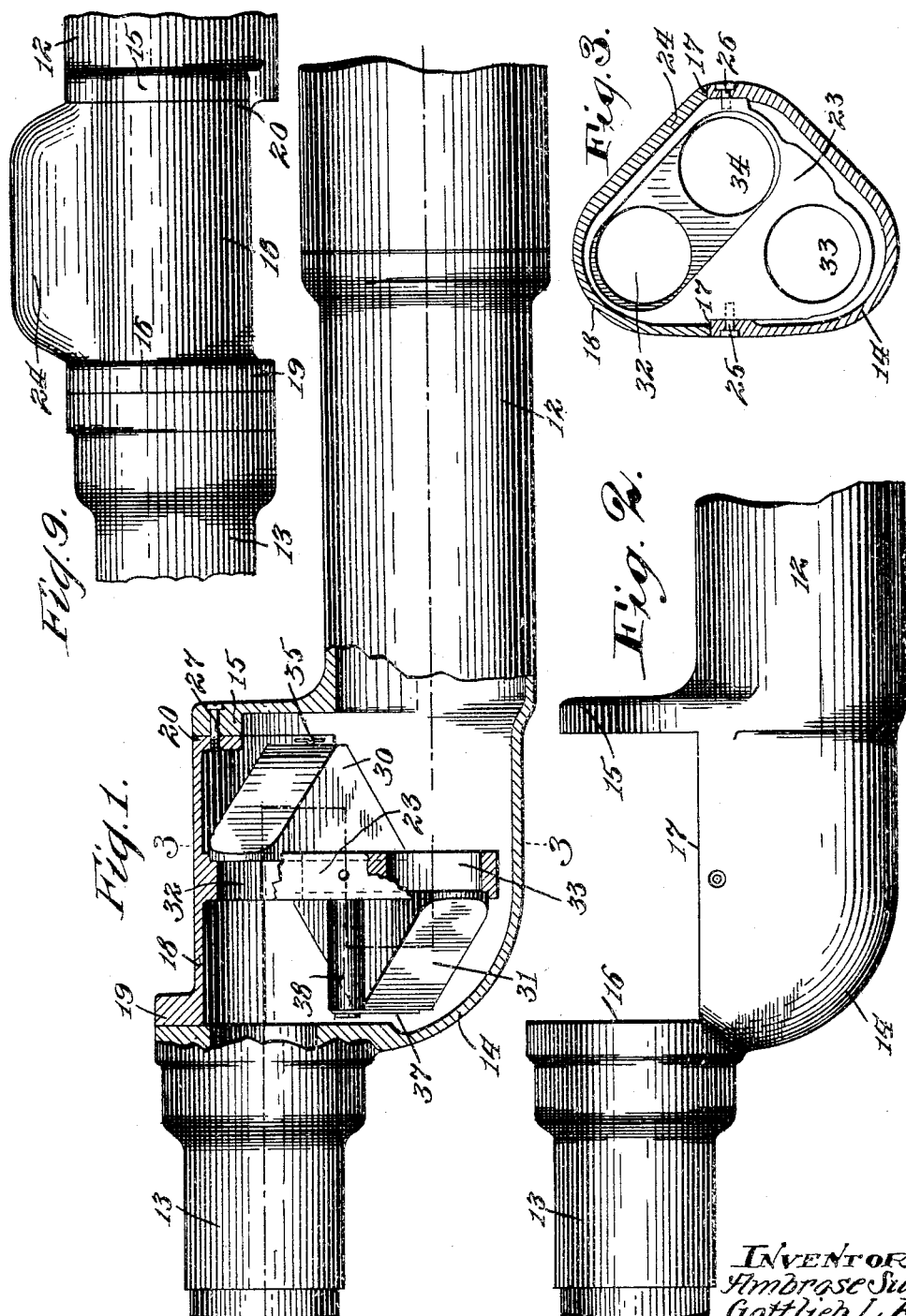

UNITED STATES PATENT OFFICE.

AMBROSE SWASEY AND GOTTLIEB L. FECKER, OF CLEVELAND, OHIO, ASSIGNORS TO THE WARNER & SWASEY COMPANY, OF CLEVELAND, OHIO, A CORPORATION OF OHIO.

OPTICAL INSTRUMENT.

No. 812,464.　　　Specification of Letters Patent.　　　Patented Feb. 13, 1906.

Application filed November 3, 1905. Serial No. 285,685.

*To all whom it may concern:*

Be it known that we, AMBROSE SWASEY and GOTTLIEB L. FECKER, residing at Cleveland, in the county of Cuyahoga and State of Ohio, citizens of the United States, have invented certain new and useful Improvements in Optical Instruments, of which the following is a specification.

This invention relates to optical instruments, such as telescopes, and has for its object to provide means for removably supporting the optical elements, such as lenses or prisms, which will be precisionized when placed in position or replaced after removal for inspection and cleaning.

The invention is particularly advantageous for use in telescopes using Porro prisms for deflecting the rays in order to shorten the actual distance of the focal line between the eyepiece and objective.

The invention includes a member removably attached to the instrument, which member carries the optical elements rigidly secured thereto independently of the instrument-body, so that the removal of the member will remove the elements without affecting their position in this member, and whereby upon replacement of the member the optical elements will be returned to their exact former position and be thereby properly precisionized, and by providing duplicate members the optical elements can be quickly substituted in case of injury.

In the drawings illustrating one embodiment of the invention, Figure 1 is a side elevation, the intermediate portion showing the tube partly in vertical section and showing the arrangement of the optical elements. Fig. 2 is a side elevation with the holder removed. Fig. 3 is a transverse section on the line 3 3 of Fig. 1. Fig. 4 is a side elevation of the holder and prisms partly broken away to show the interior arrangement. Fig. 5 is a front elevation of the holder, and Fig. 6 is a rear elevation of the same. Fig. 7 is a side elevation of the holder from the opposite side to that shown in Fig. 4. Fig. 8 shows the piece for securing one prism, and Fig. 9 is a plan view of the instrument with the end portions broken away.

In the drawings the body of the telescope comprises a tubular portion 12, connected with a tubular portion 13, carrying the eyepiece, by an irregular portion 14, the axes of the portions 12 and 13 being parallel. The part 12 has a transverse wall 15, having its inner face arranged parallel with the rear face 16 of the eyepiece-tube 13. An opening is thus formed in the body between these two walls and a straight portion 17 on each side of the irregular part 14. This opening is closed by a holder member comprising a cylindrically-segmental plate 18, having a flanged end portion 19 arranged to engage the rear face 16 of the eyepiece and having its opposite flat end 20 arranged parallel to the face 19 and arranged to snugly engage the inner face of the wall 15. The straight edges 21 and 22 on opposite sides of this segment 18 engage the two edges 17 of the part 14, these four engaging faces of the member serving to close the opening into the body.

The segment 18 of the holder has a transverse member extending into the telescope on which the prisms are solely supported, so that the removal of the holder will carry with it the prisms, and its replacement in its former position will return the prisms to their precise former position. The holder is shown as provided with an intermediate transverse wall 23, somewhat triangular in contour and which may be formed integral with the segment 18 of the holder. The irregular part 14 is offset at one side at 24 to accommodate the projecting side of the wall 23, and this side of the segment 18 is similarly extended, as indicated in the plan view of Fig. 9.

The wall 23 when the holder is placed in the telescope-body engages the portion 14 at its upper part, at which portion a fastening-screw 25 passes through the body into the wall 23. On the opposite side the wall 23 engages the upper portion of the part 14 and is there secured by means of the screw 26 passing through the body and tapped into the wall 23. The lower portion of the wall 23 between these places of attachment may be offset from the part 14, as indicated in Fig. 3. Additional means of rigidly securing the holder in position may be used by securing the adjacent parallel walls of the part 18. The screw 27 passes through an aperture in the transverse wall 15 and is tapped into the rear face of the plate 18, while at the front of the part 18 screws 28 pass through apertures 29 in the flanged portion 19 of the holder and are tapped into the rear end of the eyepiece. It will be evident that by means of these screws the holder is rigidly secured in position and that when removed and replaced it will be in precisely the same position as formerly, and other holdes carrying adjusted prisms can be substituted quickly when necessary by breakage.

Where Porro prisms, such as 30 and 31, are used, they are secured to opposite sides of the wall 23 and set at a right angle with each other. This wall 23 is provided with three openings, one of them, 32, at the upper part of the wall being in alinement with the axis of the eyepiece 13. Another aperture 33 at the lower part of the wall is in alinement with the axis of the portion 12 of the telescope-body, while a third aperture 34 is arranged to one side of the two apertures, the lines joining its center with those of the other two apertures, forming a right angle. The prism 30 has its base covering the apertures 32 and 34, and the wall 23 is preferably channeled to form a recess in which the base of the prism is seated. To secure the prism in such recess, a strip 35 has its ends inserted in two slots 36, one on each side of the rear portion of the plate 18 adjacent its lower edges. The ends of the plate are slid into these slots from below, and its middle portion engages the ridge of the prism and secures it in position. The other prism is similarly seated in a recess that includes the openings 33 and 34 on the opposite face of the supporting-wall 23. This prism is secured in position by means of a spring-plate 37, screwed fast to the end of a post 38, projecting forward from the wall 23. The arrangement of these two prisms will cause the rays of light entering the tubular portion 12 to be deflected four times and directed into the eyepiece 13 in the well-known manner, which is indicated by broken lines in Fig. 1. It will thus be seen that each of the prisms is rigidly secured to the holder, the forward prism being carried entirely by the wall 23, while the other prism is clamped between the wall and the rear portion of the segment. By removing the five securing-screws the holder can be removed from the body for inspection or cleansing of the prisms, and when replaced in position they will be precisionized by means of the parallel walls of the segment 18 engaging opposite parallel walls of the body portion, as well as by the engagement of the side edges of the segment with the edges 17 of the intermediate part of the body.

By reason of the arrangement and form of the engaging walls or faces of the body portion and holder and by reason of the method of removably securing the holder on which the optical elements are solely carried in the body of the instrument we are enabled to have duplicate holders carry the same form of optical elements for substitution should they become damaged, which is a very advantageous feature in military or naval affairs. Furthermore, different forms of optical elements can be mounted on these holders, and thus the operation of the instrument varied.

What we claim is—

1. In an optical instrument, a body portion provided with an opening and having opposite transverse walls, a holder having opposite walls arranged to engage said transverse walls, fastening means for removably securing the holder and body in a predetermined position, and optical elements carried by the holder and precisionized in the body by said fastening means.

2. In an optical instrument, a body portion provided with an opening having opposite transverse walls and also having longitudinal walls connecting the transverse walls, a holder arranged to close said opening and having its opposite end portions arranged to engage said opposite transverse walls of the opening, the holder having longitudinal edges connecting said walls on each side arranged to abut said longitudinal edges of the body portion, fastening means arranged to removably secure said holder in position with said edges in engagement, and optical elements carried by the holder and precisionized by said fastening means.

3. In an optical instrument, a tubular body portion offset to form two parts having parallel axes, the body portion being provided with an opening at the offset part having opposite transverse walls disposed parallel and also having longitudinal walls connecting the transverse walls, a holder having its opposite end portions arranged to engage said transverse walls of the body portion, and also having longitudinal edges on each side arranged to abut said longitudinal edges of the body portion, fastening means arranged to removably secure the holder with said end portions and said longitudinal edges in engagement, and optical elements carried by the holder and precisionized by said fastening means.

4. An optical instrument having a tubular body portion offset to form two parts having parallel axes, the body portion being provided with an opening at the offset part having opposite transverse walls, and a holder carrying optical elements and removably secured to the body at such opening, the holder having two faces engaging said opposite walls in the body to precisionize the optical elements in alinement with said axes respectively.

5. An optical instrument having a tubular body portion offset to form two parts having parallel axes, the body portion being provided with an opening at the offset part having opposite transverse walls disposed parallel, and a holder carrying optical elements and removably secured in the body at such opening, the holder having opposite parallel sides engaging said opposite walls in the body to precisionize the optical elements in alinement with said axes respectively.

6. In an optical instrument, a body portion provided with an opening having opposite transverse walls, a holder having a segmental portion arranged to close said opening and provided with opposite transverse walls engaging said walls of the body, a transverse wall carried by the segmental portion and extending into the body, fastening means between said engaging portions of the holder and body, and prisms carried solely by said holder portion and precisionized in the instrument by said engagement of the holder and body.

7. In an optical instrument, a body portion provided with an opening having opposite transverse walls, a holder having a segmental portion arranged to close said opening and provided with opposite transverse walls engaging said walls of the body, a transverse wall carried by the segmental portion of the holder and extending into the body, fastening means between said engaging portions of the holder and body, and prisms carried on opposite sides of said wall and precisionized in the instrument by said engagement of the holder and body.

8. In an optical instrument, a body portion provided with an opening having opposite transverse walls, a holder having a segmental portion arranged to close said opening and provided with opposite transverse walls engaging said walls of the body, a transverse wall carried by the segmental portion of the holder and extending into the body and engaging its inner face, fastening means between said engaging portions of the segment and body, fastening means between the body and transverse wall of the holder, and prisms carried solely by said holder portions and precisionized in the instrument by said engagement of the holder and body.

9. In an optical instrument, a body portion provided with an opening having opposite transverse walls, and also having longitudinal walls connecting the transverse walls, a holder having a segmental part arranged to close said opening and having its opposite end portions arranged to engage said opposite transverse walls of the opening, the segmental part having longitudinal edges on each side arranged to abut said longitudinal edges of the body-opening, fastening means securing said holder to the body, a transverse wall on the segmental part of the holder extending into the body and having three openings therein, the wall having a recess in one face including two of such openings, a prism seated in such recessed portion, a post secured to such wall, a strip secured to such post and retaining said prism in position, a recess on the opposite face of the wall including two of said openings, a prism seated in the latter recess, and a strip having its ends secured in the segmental part and retaining the latter prism in position.

AMBROSE SWASEY.
GOTTLIEB L. FECKER.

Witnesses:
L. B. STAUFFER,
F. H. RICE.